US009000697B2

(12) United States Patent
Swize

(10) Patent No.: US 9,000,697 B2
(45) Date of Patent: Apr. 7, 2015

(54) SYSTEM AND METHOD FOR DRIVING THREE-PHASE MOTOR

(75) Inventor: Gregory Swize, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 736 days.

(21) Appl. No.: 13/221,045

(22) Filed: Aug. 30, 2011

(65) Prior Publication Data

US 2013/0049658 A1    Feb. 28, 2013

(51) Int. Cl.
*H03K 5/00* (2006.01)
*H02P 6/18* (2006.01)
*H02P 6/00* (2006.01)

(52) U.S. Cl.
CPC  *H02P 6/18* (2013.01); *H02P 6/182* (2013.01); *H02P 6/002* (2013.01)

(58) Field of Classification Search
CPC ...................................... H02P 6/182
USPC ...................................... 318/400.13
See application file for complete search history.

(56) References Cited

U.S. PATENT DOCUMENTS

| 5,307,439 | A | * | 4/1994 | Enami | 388/811 |
| 5,859,512 | A | * | 1/1999 | Buthker | 318/400.04 |
| 5,866,998 | A | * | 2/1999 | Menegoli | 318/400.27 |
| 6,104,153 | A | * | 8/2000 | Codilian et al. | 318/362 |
| 6,653,805 | B2 | * | 11/2003 | Menegoli | 318/400.13 |
| 7,088,067 | B2 | * | 8/2006 | Yamamoto et al. | 318/400.34 |
| 7,102,307 | B2 | * | 9/2006 | Shao | 318/400.35 |
| 7,279,860 | B2 | * | 10/2007 | MacKay | 318/400.34 |
| 7,477,034 | B2 | * | 1/2009 | MacKay | 318/432 |

* cited by examiner

*Primary Examiner* — Erick Glass
(74) *Attorney, Agent, or Firm* — Alan A. R. Cooper; Frank D. Cimino

(57) ABSTRACT

The present invention provides a method for driving a three-phase motor with a driver. The driver can provide a pulse-width modulated driving signal and a linear driving signal. The three-phase motor has a first leg, a second leg and a third leg. The method includes: connecting the second leg to the driver; floating the third leg; driving the second leg with the pulse-width-modulated driving signal from the driver; estimating a time when a voltage in the third leg will reach a predetermined threshold; and driving the second leg with the linear driving signal during that time.

20 Claims, 9 Drawing Sheets

SYSTEM AND METHOD FOR DRIVING THREE-PHASE MOTOR

BACKGROUND

Three-phase electric power is a common method for providing alternating current for power generation, transmission and distribution. For three-phase systems, three circuit conductors transmit three alternating currents of the same frequency and differing phase. For a particular phase, the alternating currents of the other two phases are shifted in time by one-third and two-thirds of a cycle, respectively. The differing in the phases of the three alternating currents enables constant transfer of power to a load.

Three-phase electric power provides efficient transfer of power to three-phase motors. In general, a three-phase motor includes three stators (i.e. stationary portion) and three rotors (i.e. rotating portion). Three-phase electrical power applied to a three-phase motor results in current flow traversing the three stators of the motor. The current flow traversing the three stators results in a magnetic field, which produces magnetic torque on the three rotors. The magnetic torque applied to the three rotors results in rotation of the rotors.

Pulse Width Modulation (PWM) techniques may be used for controlling the operation of three-phase motors. PWM uses a modulated rectangular pulse wave for generating a variation associated with the average value of a waveform. Conventional implementations of PWM for driving three-phase motors operate to increase performance and efficiency associated with the operation of three-phase motors.

Some conventional PWM three-phase motor implementations use rotor location information received from sensors for generating necessary PWM signals for controlling three-phase motors. Other conventional PWM three-phase motor implementations use detection of zero voltage crossing points associated with Back Electro Motive Force (BEMF) via one of the three legs of the three-phase motor, which is not powered.

For conventional PWM implementations associated with three-phase motors, detection of BEMF may be performed by configuring one of the three phases as high impedance, while sourcing a second phase to ground and modulating a third phase.

A common problem of this methodology is errors and noise produced on the leg configured for high impedance as a result of rising and falling edges induced on the modulated third leg.

Additionally, the induced noise and errors may result in a reduction in the system-level performance. Conventional methods for reducing the effects of the noise and errors include ignoring the leg sourced as high impedance during periods of larger error, filtering the high impedance leg and damping the high impedance leg for removal of errors.

FIGS. 1A-F are cross-sectional illustrations for an example conventional motor 100.

Motor 100 includes a rotor 102 and a stator 104. Motor 100 operates as a three-phase motor for converting electrical power to mechanical power. For this example, rotor 102 is located exterior to stator 104. Rotor 102 rotates about stator 104, with stator 104 being stationary. Rotor 102 includes a magnet 106, a magnet 108 and a magnet 110. Magnets 106, 108 and 110 provide magnetic fields. Stator 104 includes a first leg 112, a second leg 114 and a third leg 116. Legs 112, 114 and 116 provide magnetic fields. The interoperation of magnets 106, 108 and 110 with legs 112, 114 and 116 cause rotor 102 to rotate about stator 104.

For discussion with respect to FIGS. 1A-F, consider rotor 102 rotating in a clockwise direction.

In FIG. 1A, magnet 106 is located with respect to first leg 112 by an angle 120 also denoted as θ. At this time of the revolution of rotor 102, magnet 106 has not yet reached first leg 112.

In FIG. 1B, rotor 102 has rotated such that magnet 106 has passed first leg 112 by angle 120.

In FIG. 1C, magnet 106 is lagging with respect to second leg 114 by angle 120. At this time of the revolution of rotor 102, magnet 106 has not passed second leg 114.

In FIG. 1D, magnet 106 has passed second leg 114 by angle 120.

In FIG. 1E, rotor 102 has rotated such that magnet 106 is lagging with respect to third leg 116 by angle 120. At this time of the revolution of rotor 102, magnet 106 has not passed third leg 116.

In FIG. 1F, magnet 106 has passed third leg 116 by angle 120.

To efficiently drive motor 100, the relative position of rotor 102 with respect to stator 104 should be known. This may be accomplished by monitoring the relative location of a single point on rotor 102 with respect to stator 104. For purposes of discussion, consider a point 118 on rotor 102. Knowing the location of point 118, with respect to stator 104, enables the determination of the location of all other points on rotor 102 with respect to stator 104. Furthermore, determining the location of point 118 with respect to stator 104 may aid in controlling the operation of motor 100. In particular, motor 100 may be driven differently for the configuration of FIG. 1A than for the configuration in any one of FIGS. 1B-F.

FIGS. 2A-F are cross-sectional illustrations for example conventional motor 100 at different times of operation.

For purposes of discussion, consider the configuration of motor 100 of FIG. 2A, wherein rotor 102 is rotating with an angular velocity, as noted by arrow 204, around stator 104. At some time, the polarity of the magnetic field provided by stator 104 should be opposite to that of the magnetic field provided by rotor 102 so as to "pull" rotor 102 toward stator 104. In this example, magnet 106 is arranged so as to provide a negative magnetic field radially inward toward stator 104. At this time, first leg 112 is driven so as to provide a positive magnetic field radially outward toward rotor 102. An attraction, as noted by an arrow 202, results from the opposite magnetic fields presented by magnet 106 and first leg 112. The attraction indicated by arrow 202 induces rotation of rotor 102 at the angular velocity, as noted by arrow 204.

Rotor 102 will continue to rotate in a clockwise direction, as shown in FIG. 2B. Similar to FIG. 2A, in FIG. 2B magnet 106 is still arranged so as to provide a negative magnetic field radially inward toward stator 104. At this time, first leg 112 is still driven so as to provide a positive magnetic field radially outward toward rotor 102. An attraction, from the opposite magnetic fields presented by magnet 106 and first leg 112, is maintained. The maintained attraction maintains rotation of rotor 102 at an angular velocity, as noted by an arrow 206.

At some time, the polarity of the magnetic field provided by stator 104 should be reversed to "push" rotor 102 away from stator 104. As shown in FIG. 2C, the polarity of the magnetic field provided by first leg 112 has switched from a positive magnetic field as described with reference to FIG. 2A-B to a negative magnetic field. In other words in FIG. 2C, magnet 106 is still arranged so as to provide a negative magnetic field radially inward toward stator 104. However, first leg 112 is driven so as to provide a negative magnetic field radially outward toward rotor 102. The similar magnetic fields provided by first leg 112 and magnet 106 create a repulsion, as noted by an arrow 208. Repulsion 208 maintains rotation of rotor 102 at an angular velocity, as noted by an arrow 210.

Rotor 102 will continue to rotate in a clockwise direction, as shown in FIG. 2D. Similar to FIG. 2C, in FIG. 2D magnet 106 is still arranged so as to provide a negative magnetic field radially inward toward stator 104. At this time, first leg 112 is still driven so as to provide a negative magnetic field radially outward toward rotor 102. A repulsion, from the similar magnetic fields presented by magnet 106 and first leg 112, is maintained. The maintained repulsion maintains rotation of rotor 102 at an angular velocity, as noted by an arrow 212.

For proper operation of motor 100, switching the polarity of the magnetic field provided by first leg 112, for example as described above with respect to FIG. 2C, must be performed at an appropriate time, i.e., at the correct relative position of rotor 102 with respect to stator 104. Accordingly, appropriate switching of magnetic field for first leg 112 requires an accurate determination of the location and velocity for rotor 102 with respect to stator 104.

FIG. 2E illustrates an example of improper timing of the switching of the polarity of the magnetic field provided by first leg 112. In FIG. 2E, rotor is rotating in a clockwise direction at an angular velocity, as noted by an arrow 216. First leg 112 is driven to provide a radially outward negative magnetic field. Because first leg 112 is driven in this manner at this time, the radially outward negative magnetic field provided by first leg 112 repels against the radially inward negative magnetic field provided by magnet 106. The repelling similar magnetic fields results in a repulsion, illustrated by arrow 214, between first leg 112 and magnet 106. In this example, the relative location of rotor 102 with respect to stator 104 may have been incorrectly ascertained resulting in the configuration of the magnetic field for first leg 112 being switched at an incorrect point in time, resulting in an unpredictable operation of motor 100.

As shown in FIG. 2F the repulsion, illustrated by arrow 214, between first leg 112 and magnet 106 may result in the undesired termination of rotation for rotor 102.

FIGS. 2A-F illustrate the importance of accurately determining the position and velocity of rotor 102 (relative to stator 104) associated with the operation for a three-phase motor. As the accuracy of the relative position and velocity increases, the more efficiently the three-phase motor may be operated.

FIG. 3 illustrates an example cross-section timing selection diagram for determining the position of rotor 102 with respect to stator 104.

For example, a position 302 is the position of point 118 on rotor 102 at time $t_1$ as shown in FIG. 1A, a position 304 is the position of point 118 on rotor 102 at time $t_2$ as shown in FIG. 1B, a position 306 is the position of point 118 on rotor 102 at time $t_3$ as shown in FIG. 1C, a position 308 is the position of point 118 on rotor 102 at time $t_4$ as shown in FIG. 1D, a position 310 is the position of point 118 on rotor 102 at time $t_5$ as shown in FIG. 1E and a position 312 is the position of point 118 on rotor 102 at time $t_6$ as shown in FIG. 1F.

Control of motor 100 may require determining the location of rotor 102 with respect to stator 104, for example by determining the location of point 118, at various points in time in order to efficiently and properly drive motor 100. An incorrect determination for the location of point 118 may result in inefficient and improper operation of motor 100. For example, if driven improperly, the magnetic fields associated with rotor 102 and stator 104 may repel one another as discussed above with reference to FIG. 2E or rotor 102 may cease rotating as discussed above with reference to FIG. 2F.

There are many known systems and methods for determining the position and velocity of a rotor, with reference to a stator, in a three phase motor. One known system and method includes driving a single leg of the three phase motor, grounding one leg of the three phase motor, and measuring a voltage on the third leg. This will be described in greater detail with reference to FIGS. 4-7.

FIG. 4 illustrates an example motor controller 400 that may be used to drive a three phase motor.

Motor controller 400 includes a sensor 402, an average portion 404, a switch 406, a controller 408, an output portion 410, a driver 411, a driver 412 and a driver 413. Motor controller 400 additionally includes signal lines 420, 422 and 424 to connect to first leg 112, second leg 114 and third leg 116, respectively. Motor controller 400 additionally includes a ground line 414, a driver line 415, a driver line 416, a driver line 417 and a floating line 418.

Motor controller 400 controls the operation of motor 100 as described with reference to FIGS. 1A-F, FIGS. 2A-F and FIG. 3.

Motor controller 400 may operate in a driving mode or in a sensing mode. In the driving mode, motor controller 400 may provide driving signals to first leg 112, second leg 114 and/or third leg 116. In this example, driver 411, driver 412 and driver 413 are able to provide separate driving signals for each of first leg 112, second leg 114 and/or third leg 116 if needed. In the sensing mode, motor controller will: drive only one of first leg 112, second leg 114 and third leg 116; will float another of first leg 112, second leg 114 and third leg 116; and will ground the final of first leg 112, second leg 114 and third leg 116.

Sensor 402 is able to detect a parameter of each of first leg 112, second leg 114 and/or third leg 116, via signals 432, 434 and 436, respectively. Average portion 404 averages the values of a parameter of two of three of first leg 112, second leg 114 and/or third leg 116, via signals 426, 428 and 430, respectively. Switch 406 controllably connects signal lines 420, 422 and 424 to ground line 414, driver line 415, driver line 416, driver line 417 or floating line 418. Controller 408 processes received signals for controlling sensor 402, average portion 404, switch 406 and output portion 410. Output portion 410 receives information associated with received and processed signals.

Sensor 402 is arranged to receive an input electrical signal as a signal 432, from first leg 112 via signal line 420. Sensor 402 is arranged to receive an input electrical signal as a signal 434, from second leg 114 via signal line 422. Sensor 402 is arranged to receive an input electrical signal as a signal 436, from third leg 116 via signal line 424. Furthermore, sensor 402 is arranged to receive a signal 440 from controller 408. Based upon the information received via signal 440, sensor 402 may be instructed to detect any of signal 432, signal 434 or signal 436. Non-limiting examples of parameters detected by sensor 402 include voltage, current, energy or power.

Average portion 404 is arranged to receive an input electrical signal as a signal 426, from first leg 112 via signal line 420. Average portion 404 is arranged to receive an input electrical signal as a signal 428, from second leg 114 via signal line 422. Average portion 404 is arranged to receive an input electrical signal as a signal 430, from third leg 116 via signal line 424.

Average portion 404 finds the average of any two of received signal 426, signal 428 and signal 430. Selection of which signals to be used for the average is received via a signal 442 provided by controller 408. Non-limiting examples of received signals include voltage, current, energy or power.

Switch 406 is operable to connect each of signal lines 420, 422 and 424 to ground line 414, driver line 415, driver line 416 driver line 417 and floating line 418. For example, in one situation, switch 406 may connect ground line 414 to signal line 420, may connect driver line 416 to signal line 422 and may connect floating line 418 to signal line 424. Switch 406 determines configuration for providing selected input signal to output signals via a signal 438 received from controller 408.

Controller 408 receives sensor information from sensor 402 via a signal 448. Controller 408 receives average information from average portion 404 via a signal 446. Controller 408 performs processing of received sensor information and average information for providing control of sensor 402, average portion 404, switch 406 and output portion 410. Non-limiting example embodiments of controller 408 include discrete semiconductors, integrated semiconductors, microprocessors and programmable logic devices.

Output portion 410 receives average information from average portion 404 via a signal 444. Output portion 410 receives control information from controller 408 via a signal 450. Output portion 410 then provides output data for a user. Output portion 410 may be any know output device, non-limiting examples of which include a monitor or a printer.

As mentioned above, motor controller 400 may operate in a driving mode or in a sensing mode. In the driving mode, motor controller 400 provides driving signals to motor 100 to rotate rotor 102 around stator 104. For example, controller 408 may instruct switch 406 to connect: driver 411 to signal line 420, thereby driving leg 112; driver 412 to signal line 422, thereby driving second leg 114; and/or driver 413 to signal line 424, thereby driving third leg 116. In some embodiments, only one of first leg 112, second leg 114 or third leg 116 is driven by one of driver 411, driver 412 or driver 413. In any event, drivers 411, 412 and 413 may provide driving signals to alternate the polarity of the magnetic fields of legs 112, 114 and 116 as needed to attract or repel magnets 106, 108 and 110, as discussed above with reference to FIGS. 1A-F.

However, as discussed above with reference to FIGS. 2A-F, motor controller 400 must be able to switch the polarity of the magnetic fields of legs 112, 114 and 116 at the correct time, or more precisely, at the correct relative position of rotor 102 (as compared to stator 104). To accomplish this, motor controller 400 operates in the sensing mode. One conventional method of determining a position of the legs of a three-phase motor is to set one leg to ground, float another leg and drive the third leg. The driven third leg will induce a voltage in the floating leg. The induced voltage in the floating leg will increase in a generally linear fashion. A predetermined voltage threshold is set, which corresponds to a position of the three-phase motor. When the induced voltage in the floating leg crosses predetermined threshold, then the three-phase motor should be in the position associated with the voltage threshold. This will be described in greater detail with reference to FIG. 5.

FIG. 5 presents an illustration for an example conventional motor system 500, when operating in a conventional sensing mode.

Motor system 500 includes motor 100 and motor controller 400.

In this example, switch 406 is configured via signal 438 received from controller 408 such that signal line 420 is connected to ground line 414, signal line 422 is connected to driver 412 and signal line 424 is connected to floating line 418. In this example mode, driver 411 and driver 413 are not utilized. In other example modes, any of drivers 411, 412 or 413 may be used. In this example mode, first leg 112 is set to ground potential, second leg 114 is driven by driver 412 and signal line 422 and third leg 116 floats. For other examples, depending upon the location of rotor 102 with respect to stator 104, a different configuration for switch 406 may be provided by controller 408.

First leg 112 includes a magnetic portion 502 and a coil 504. Second leg 114 includes a magnetic portion 506 and a coil 508. Third leg 116 includes a magnetic portion 510 and a coil 512.

When coil 504 receives a driving signal, first leg 112 converts electrical power received by coil 504 into a magnetic field for interaction with magnetic portion 502, which produces torque, which results in mechanical power. Similarly, when coil 508 receives a driving signal, second leg 114 converts electrical power received by coil 508 into a magnetic field for interaction with magnetic portion 506, which produces torque, which results in mechanical power. Finally, when coil 512 receives a driving signal, third leg 116 converts electrical power received by coil 512 into a magnetic field for interaction with magnetic portion 510, which produces torque, which results in mechanical power.

For purposes of explanation, in this example, presume that second leg 114 is arranged to be driven by a PWM signal. The arrangement of legs associated with ground potential, PWM signal or floating may be configured differently as needed depending upon the configuration and operation of motor 100. For example, for a period of time, first leg 112 may be arranged as floating, second leg 114 may be arranged to receive ground potential and third leg 116 may be arranged to receive a PWM signal. For purposes of discussion, a single situation will be described.

First leg 112 is arranged to receive ground potential via signal line 420, which is detected by average portion 404. Second leg 114 is arranged to receive a signal from driver 412 via signal line 422, which is detected by average portion 404. Third leg 116 floats via signal line 424, which is detected by sensor 402.

First leg 112, second leg 114 and third leg 116 are jointly connected for generating a return signal 514.

Sensor 402 provides signal 448 to controller 408 as a measurement of motor 100. Sensor 402 converts the signal received via signal 436 to information signaling an event or condition of some type for presentation to signal 448. For example, sensor 402 may measure the voltage potential associated with signal 436. By monitoring the voltage potential of signal 436, controller 408 looks for a transition through a voltage potential of zero Volts. Furthermore, sensor 402 may convert recognition of a transition for signal 436 thorough a voltage potential of zero Volts to a pulse or toggle signal associated with signal 448. For example, a digitally sampled signal with discrete voltage values of $\{-3, -2, -1, 0, 1, 2, 3\}$ might present a digital signal $\{0, 0, 0, 1, 0, 0, 0\}$ to signal 448, with the fourth output sequence value indicating the fourth input sequence crossing a voltage potential of zero Volts. Signal 446 is a characterization of an average calculation performed for signals as generated by average portion 404 and presented to controller 408. For this example, average portion 404 performs an average calculation for received signal 426 and received signal 428. For example, for a digitally sampled signal 426 with discrete voltage values of $\{1, 2, 3\}$ over three discrete samples and for a digitally sampled signal 428 with discrete voltage values of $\{4, 5, 6\}$ over the same discrete samples, the average value would be calculated as $\{(1+4)/2, (2+5)/2, (3+6)/2\}$ or $\{2.5, 3.5, 4.5\}$.

At certain periods of time, one of the three legs is set to ground. In this example situation, first leg 112 is set to ground line 414. Furthermore, a second of the three legs is driven by a PWM signal. In this example situation, second leg 114 is driven by a PWM signal provided by driver 412. Furthermore, the third leg of the three legs is floated. In this example situation, third leg 116 is floated by being connected to floating line 418. A BEMF is induced in the floating leg in this detection method. The BEMF is used to determine a relative position of rotor 102 as compared to stator 104, as will now be described in greater detail.

When applying a voltage to create an electro-motive force, a motor's armature may begin to rotate and as a result a certain amount of electrical resistance is generated by the rotating magnetic field. Furthermore, this amount of electrical resistance may be denoted as BEMF. For a motor using a rotating armature in the presence of a magnetic flux, the coil conductors of the motor transition through the magnetic field lines as the motor rotates. The changing field strength produces voltages in the coils, which may be considered as the motor operating in a similar manner as a generator, or also may be considered as the voltage produced from the BEMF opposing the originally applied voltage.

In many cases, the signal produced on the floating or high impedance leg (e.g. third leg 116 in this example) may be considered as being corrupted as a result of the signal noise produced from the pulse width modulated signal injected on the other leg (e.g. second leg 114 in this example). Furthermore, the noise or error may need to be removed from the floating leg (e.g. third leg 116) in order to accurately measure the BEMF.

Additionally, for conventional motor system 500 of FIG. 5, the system level performance may need to be reduced or degraded in order to tolerate the increased noise or error injected into the floating leg and measured via the motor position signal (e.g. signal 436).

Conventional methods for reducing the effects of noise or error include ignoring the signal produced by the floating leg during periods of large error, filtering the signal produced by the floating leg to remove some portions of the noise and damping the leg for earlier removal of the induced noise or errors. Furthermore, these conventional methods for reducing the effects of noise or error may present negative issues associated with the operation of motor system 500.

It should be noted that illustrations and descriptions with reference to FIG. 5 are considered for a portion of a cyclical period associated with the operation of motor system 500. For example, for a different portion of the cyclical period associated with motor system 500, second leg 114 may be driven by ground portion potential (or similar), third leg 116 may be driven by driver 412 (or similar) and first leg 112 may be configured for high impedance.

To reiterate, motor controller 400 may operate in a driving mode or a sensing mode. In the driving mode, motor controller 400 drives motor 100 such that rotor 102 rotates around stator 104. In the sensing mode, motor controller 400 drives one leg of motor 100, sets one leg of motor 100 to ground and floats the remaining leg of motor 100 to monitor a BEMF in the floating leg. The driving mode will be described with reference to FIG. 6, whereas the sensing mode will be described with reference to FIG. 7.

FIG. 6 presents an illustration of an example graph of waveforms for motor controller 400 described above with reference to FIG. 4, when operating in the driving mode.

As illustrated in FIG. 6, a graph 600 includes a y-axis 602, in Volts, and an x-axis 604, in milliseconds. Graph 600 includes a waveform 606, a waveform 608 and a waveform 610.

In this example, two legs of motor 100 are being driven whereas one leg is connected to ground. For example, waveform 606 represents a signal on signal line 420, when driver 411 (FIG. 4) is driving leg 112. Waveform 606 includes a pulse 612, a pulse 614 and a pulse 616. Waveform 608 represents signal line 422 being driven to ground potential. Waveform 610 represents signal line 424, when driver 413 (FIG. 4) is driving third leg 116. Waveform 610 includes a pulse 618, a pulse 620 and a pulse 622.

For brevity of discussion, illustrations and descriptions with reference to FIG. 6 are considered for a portion of a cyclical period associated with the operation of motor system 500 in the driving mode. For example, for a different portion of the cyclical period associated with motor system 500, waveform 606 may be configured for ground potential, waveform 608 may be configured for a wider pulse width modulated scheme and waveform 610 may be configured for a narrower pulse width modulated scheme.

Configuring varying pulse widths for signals as illustrated with reference to waveform 606 and waveform 610 may sufficiently provide for conversion of supplied electrical power to mechanical power for motor 100. Furthermore, the varying pulse widths may provide sinusoidal electrical currents for motor 100.

There will come a time when the polarity of the radially outward magnetic field generated by a leg of motor 100 must be reversed, for example a time between the state illustrated in FIG. 2B and the state illustrated in FIG. 2C. A designer of motor 100 will have a general estimate of this time, based on the geometry and materials of motor 100. However, to more accurately determine this time, motor controller 400 should be operated in the sensing mode. Accordingly, when rotor 102 approaches a predetermined estimated position, motor controller 400 operates in the sensing mode, to more accurately determine the actual position of rotor 102 with reference to stator 104, so that drivers 411, 412 and 413 may switch the polarities for legs 112, 114 and 116 at the appropriate time.

When motor controller 400 operates in the sensing mode, for example as illustrated in FIG. 5, sensor 402, average portion 404, controller 408 and output portion 410 are able to determine a more accurate position of rotor 102 with reference to stator 104.

In this example, controller 408 instructs sensor 402, via signal 440, to detect the voltage on each of legs 112, 114 and 116 via signals 432, 434 and 436, respectively. In the case where motor controller 400 is in the state of FIG. 5, the voltage on leg 112 will be set to ground, as leg 112 is connected to ground line 414. The voltage on second leg 114 will correspond to the driving signal provided by driver 412, as second leg 114 is connected to driver 412. The voltage, on third leg 116 will be the BEMF, as third leg 116 is connected to floating line 418. The processing of the received voltage by sensor 402 associated with third leg 116 is passed to controller 408 as signal 448. For example, sensor 402 may process a received signal crossing zero Volts via a floating leg (e.g. third leg 116) to a pulse signal for delivery to controller 408 via signal 448.

Average portion 404 will take the average of the voltages of the grounded leg and the driven leg of motor 100. In the case where motor controller 400 is in the state of FIG. 5, controller 408 instructs, via signal 442, average portion 404 to compute the average of the voltages on first leg 112 and second leg 114. This average is passed to controller 408 as signal 446.

With the average of the voltages of the grounded leg and the driven leg of motor 100 as provided by average portion 404 and an indication for the voltage on the floating leg as provided by sensor 402, controller 408 is able to determine a more accurate position of rotor 102 relative to stator 104. This position information is provided to output portion 410 as signal 450. Output portion 410 may then provide this data in a usable format. In one example output format, a graph is used. This will now be described with reference to FIG. 7.

FIG. 7 presents an illustration of an example graph of waveforms for motor system 500 described above with reference to FIG. 5, when operating in the sensing mode.

A graph 700 includes a y-axis 702, in Volts, and an x-axis 704, in milliseconds. Graph 700 includes a dotted waveform 706, a waveform 708 and a waveform 710.

Waveform 708 represents the voltage on signal line 420, i.e., ground connected to leg 112.

Waveform 710 represents the voltage on signal line 422, i.e., the driving signal provided by driver 412 to second leg 114. Waveform 710 includes a pulse 711 with a rising edge 712 and a falling edge 722, a pulse 714 and a pulse 716.

Dotted waveform 706 represents the voltage on signal line 424, i.e., the BEMF induced on third leg 116. Dotted waveform 706 increases generally linearly as denoted by a linear reference line 707. A dashed line 726 is a predetermined threshold, wherein when dotted waveform 706 crosses dashed line 726, rotor 102 is in a known location relative to stator 104. In this example, if dotted waveform 706 closely followed linear reference line 707, dotted waveform 706 would cross dashed line 726 at a point 730. Accordingly, at the time of point 730 the location of rotor 102 would be known relative to stator 104. With this known location, controller would be able to instruct drivers 411, 412 and 413 precisely when to reverse the polarities on the driving signals for motor 100, for example as discussed above with reference to FIGS. 2B-C.

In conventional methods, dashed line 726 is set as the average of the voltage of the driven leg (in this example second leg 114) and the leg set to ground (in this example, leg 112). Clearly, as the driven leg is driven with a non-direct driving signal (including PWM signals), an average of the voltages of the driven leg and the leg set to ground would additionally be a non-direct driving signal. However, for purposes of discussion, dashed line 726 is shown as a constant voltage.

Due to errors, dotted waveform 706 does not follow linear reference line 707. Dotted waveform 706 instead crosses dashed line 726 at a location denoted by a point 728, before point 730. Accordingly, at the time of point 728 the location of rotor 102 would be incorrectly assessed relative to stator 104. With this incorrect location, controller 408 may incorrectly instruct drivers 411, 412 and 413 when to reverse the polarities on the driving signals for motor 100, for example as discussed above with reference to FIGS. 2E-F.

Some of the errors that prevent dotted waveform 706 from following linear reference line 707 are acute changes in the BEMF as a result of impulses in the driving signal in the driven leg. In particular, very high frequency aspects of the rising and falling edges of waveform 710 (the voltage on signal line 422, i.e., the driving signal provided by driver 412 to second leg 114) create drastic changes in dotted waveform 706 (voltage on signal line 424, i.e., the BEMF induced on third leg 116). For example, the error at a point 720 of dotted waveform 706 results from the occurrence of rising edge 712 of pulse 711, whereas the error at a point 724 of dotted waveform 706 results from the occurrence of falling edge 722 of pulse 711. Furthermore, errors may be exhibited by dotted waveform 706 as a result of the rising and falling edges for pulses 714 and 716.

In other words, as a result of very high frequency aspects of the rising and falling edges of a PWM driving signal provided to drive one leg of a three-phase motor during a sensing process, a controller may incorrectly instruct drivers when to reverse the polarities on the driving signals for the motor during a driving process. The incorrect instructions for driving may lead to an improper driving of the motor, for example as discussed above with reference to FIGS. 2E-F.

Illustrations and descriptions with reference to FIG. 7 are considered for a portion of a cyclical period associated with the operation of motor system 500. For example, for a different portion of the cyclical period associated with motor system 500, dotted waveform 706 may be configured for ground potential, waveform 708 may be configured for a pulse width modulated signal and waveform 710 may be configured for high impedance.

In view of the foregoing, there is a need for improved techniques for driving three-phase motors using pulse width modulation techniques.

BRIEF SUMMARY

In accordance with aspects of the present invention, a system and method is provided for sourcing a three-phase motor using pulse width modulation which provides reduced errors and noise associated with BEMF and as a result may improve system-level performance.

In accordance with aspects of the present invention, a method is provided for driving a three-phase motor with a driver, wherein the driver can provide a pulse-width modulated driving signal and a linear driving signal, and the three-phase motor has a first leg, a second leg and a third leg. The method includes connecting the second leg to the driver; floating the third leg; driving the second leg with the pulse-width-modulated driving signal from the driver; estimating a time when a voltage in the third leg will reach a predetermined threshold; and driving the second leg with the linear driving signal during the time.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings.

DETAILED DESCRIPTION

Figure 1A:
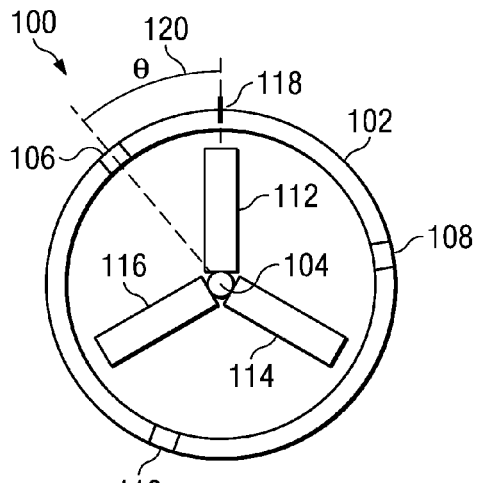
FIGS. 1A-F are cross-sectional illustrations for an example conventional motor.
Figure 1B:
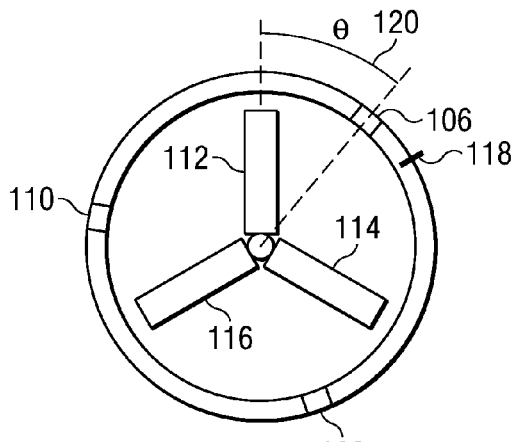
Figure 1C:
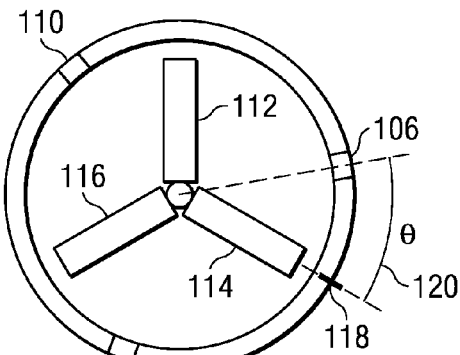
Figure 1D:
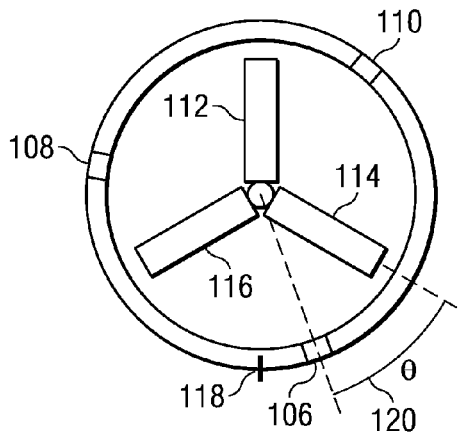
Figure 1E:
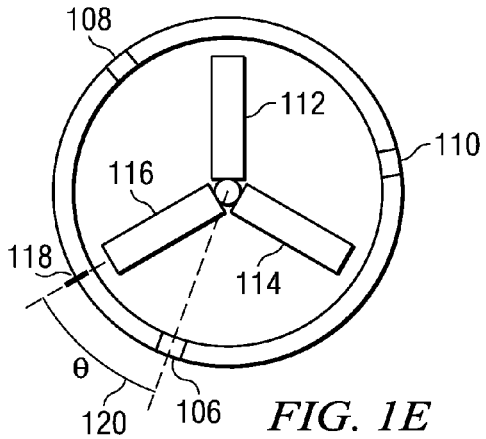
Figure 1F:
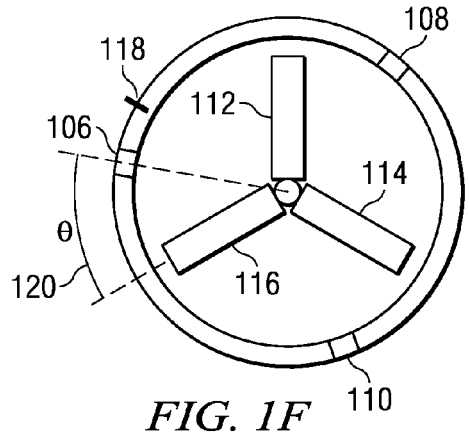
Figure 2A:
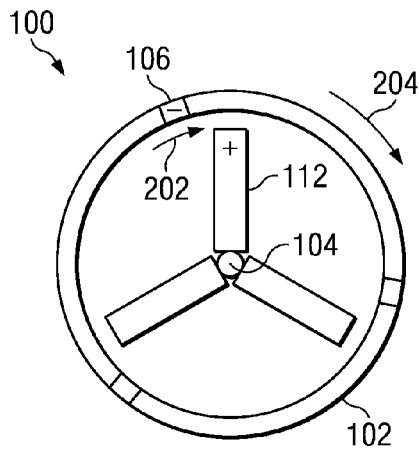
FIGS. 2A-F are cross-sectional illustrations for example conventional motor.
Figure 2B:
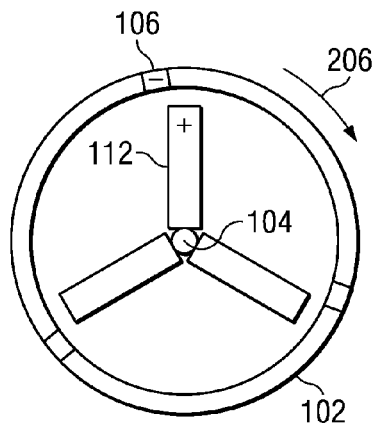
Figure 2C:
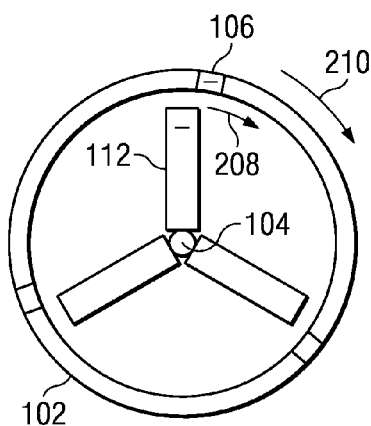
Figure 2D:
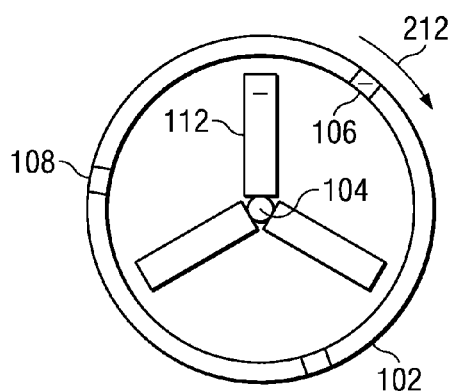
Figure 2E:
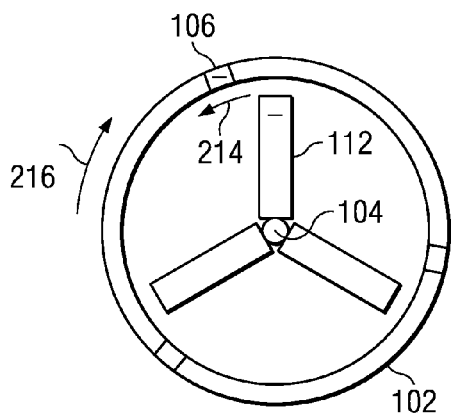
Figure 2F:
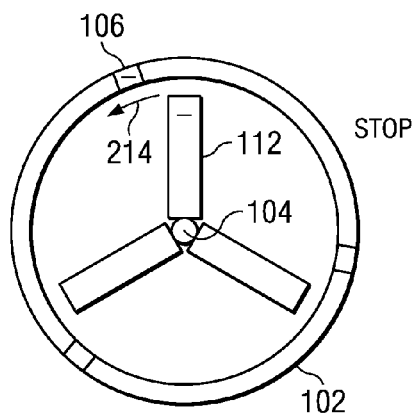
Figure 3:
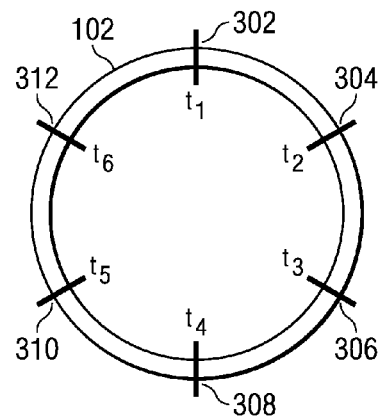
FIG. 3 illustrates an example cross-section timing selection diagram for determining the position of a rotor with respect to a stator.

Aspects of the present invention are drawn to a three-phase motor control system that has a driving mode and a sensing mode, wherein the sensing mode drives one leg, sets the second leg to ground and floats the third leg. In accordance with aspects of the present invention, during the sensing mode, the driven leg is driven with a linear driving signal. By driving the driven leg with a linear driving signal, there are no rising or falling edges in the driving signal. Accordingly, there are no very high frequency aspects of the rising and falling edges of a PWM driving signal. Therefore, there is less fluctuation in the induced BEMF on the floating leg. Therefore, a controller may more accurately determine the location of the rotor relative to the stator of the motor. The controller will therefore more accurately instruct drivers when to reverse the polarities on the driving signals for the motor during a driving process. The more accurate instructions for driving may lead to proper driving, thus avoiding examples as discussed above with reference to FIGS. 2E-F.

Figure 8:
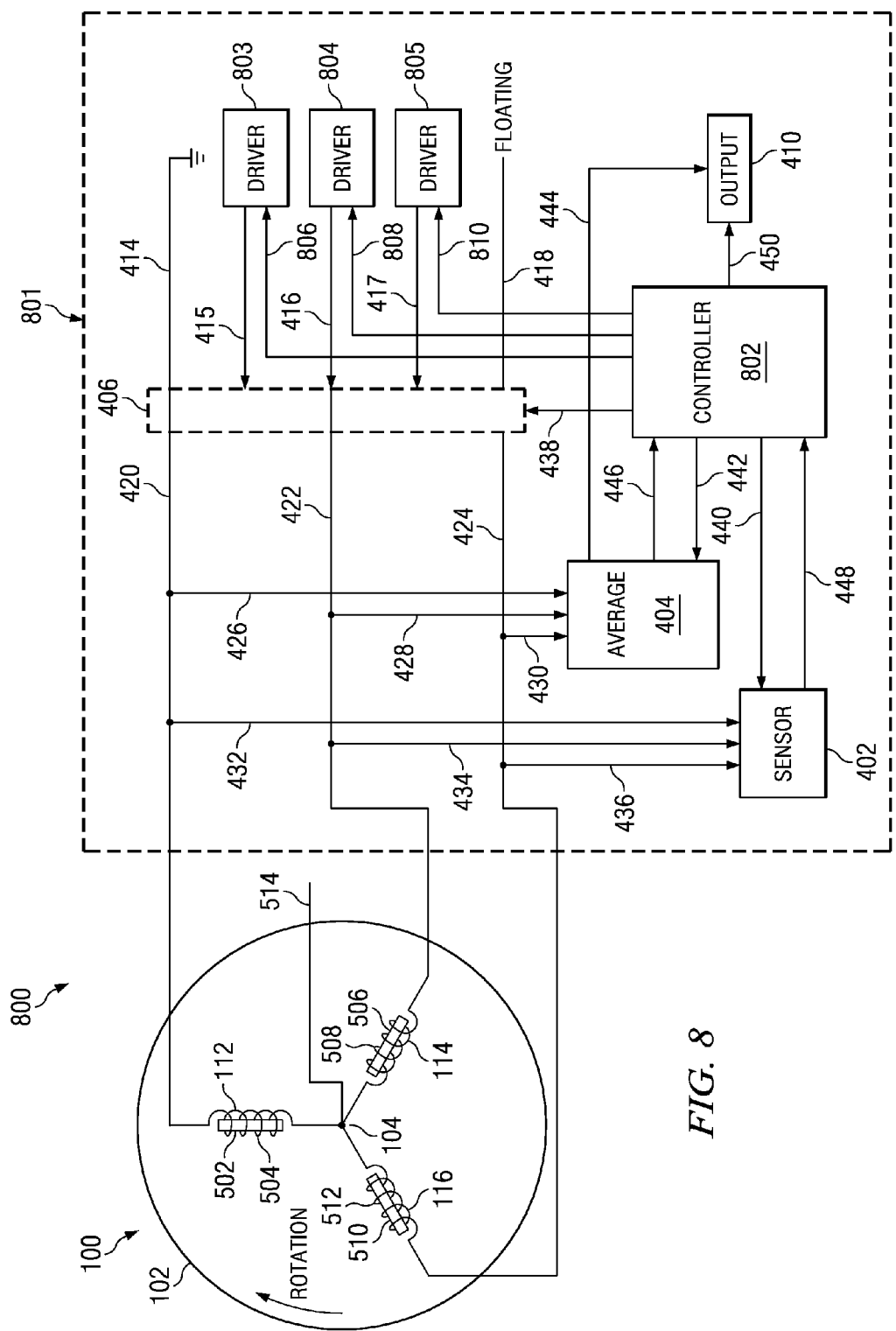
FIG. 8 illustrates an example motor system when operating in sensing mode, in accordance with an aspect of the present invention.

FIG. 8 illustrates an example motor system 800 when operating in sensing mode, in accordance with an aspect of the present invention.

Motor system 800 includes motor 100 and a motor controller 801.

Motor controller 801 controls the operation of motor 100 as described with reference to FIGS. 1A-F, FIGS. 2A-F and FIG. 3.

Motor controller 801 operates to efficiently control the operation of motor 100.

Motor controller 801 includes sensor 402, average portion 404, switch 406, output portion 410, a controller 802, a driver 803, a driver 804 and a driver 805.

In this example, sensor 402, average portion 404, switch 406, output portion 410, controller 802, driver 803, driver 804 and driver 805 are illustrated as individual devices. However, in some embodiments, at least two of sensor 402, average portion 404, switch 406, output portion 410, controller 802, driver 803, driver 804 and driver 805 may be combined as a unitary device. Further, in some embodiments, at least one of sensor 402, average portion 404, switch 406, output portion 410, controller 802, driver 803, driver 804 and driver 805 may be implemented as a tangible computer-readable media for carrying or having computer-executable instructions or data structures stored thereon. Such tangible computer-readable media can be any available media that can be accessed by a general purpose or special purpose computer. Non-limiting examples of tangible computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. For information transferred or provided over a network or another communications connection (either hardwired, wireless, or a combination of hardwired or wireless) to a computer, the computer may properly view the connection as a tangible computer-readable medium. Thus, any such connection may be properly termed a tangible computer-readable medium. Combinations of the above should also be included within the scope of tangible computer-readable media.

Controller 802 performs processing of received signals for controlling sensor 402, average portion 404, switch 406 and output portion 410. Drivers 803, 804 and 805 provide driving signals. Non-limiting examples of signals provided by driver 804 include sinusoid, pulse, impulse, pulse width modulated and linear signals.

Motor controller 802 may operate in a driving mode or in a sensing mode. In the driving mode, motor controller 802 may provide driving signals to first leg 112, second leg 114 and/or third leg 116. In this example, driver 803, driver 804 and driver 804 are able to provide separate driving signals for each of first leg 112, second leg 114 and/or third leg 116 if needed. In the sensing mode, motor controller will: drive only one of first leg 112, second leg 114 or third leg 116; will float another of first leg 112, second leg 114 or third leg 116; and will ground the final of first leg 112, second leg 114 or third leg 116.

Driver 803 receives a signal 806 from controller 802 for configuring driver 803 for linear operation during sensing mode. When not in sensing mode, driver 803 is in driving mode.

Driver 804 receives a signal 808 from controller 802 for configuring driver 804 for linear operation during sensing mode. When not in sensing mode, driver 804 is in driving mode.

Driver 805 receives a signal 810 from controller 802 for configuring driver 805 for linear operation during sensing mode. When not in sensing mode, driver 805 is in driving mode.

Drivers 803, 804 or 805 configured for linear operation at appropriate points of time associated with sensing mode enable a reduction of noise as observed by sensor 402.

In this example, switch 406 is configured via signal 438 received from controller 802 such that signal line 420 is connected to ground line 414, signal line 422 is connected to driver 804 and signal line 424 is connected to floating line 418. In this example mode, driver 803 and driver 805 are not utilized. In other example modes, any of drivers 803, 804 or 805 may be used. In this example mode, first leg 112 is set to ground potential, second leg 114 is driven by driver 804 and signal line 424 and third leg 116 floats. For other examples, depending upon the location of rotor 102 with respect to stator 104, a different configuration for switch 406 may be provided by controller 802.

Controller 802 may instruct, via signal 438, to switch 406 when the value received via signal 448 crosses the value received via signal 446, and vice-versa. This will be described in greater detail below.

As an example, controller 802 may configure switch 406 in order to select ground potential for first leg 112, to select driver 804 for driving second leg 114 and to select a floating condition for third leg 116 when necessary to detect the BEMF provided via signal 436 to sensor 402.

As another example, for other portions of time associated with the operation of motor 100, controller 802 may configure switch 406 for selecting a condition of floating for second leg 114, selecting to source first leg 112 with driver 804 and selecting third leg 116 for ground potential. Furthermore, sensor 402 may receive signal 434 for measurement of BEMF conditions.

As another example, for other portions of time associated with the operation of motor 100, controller 802 may configure switch 406 for selecting a condition of floating for first leg 112, selecting second leg 114 for ground potential and selecting to source third leg 116 with driver 804. Furthermore, sensor 402 may receive signal 432 for measurement of BEMF conditions.

Improved BEMF detection as a result of reduced errors and noise may be realized by controller 802 configuring switch 406 to configure driver 804 for linear operation when performing detection of BEMF and as a result, may realize efficient operation of motor system 800.

For brevity of discussion, illustrations and descriptions with reference to FIG. 8 are considered for a portion of a cyclical period associated with the operation of motor system 800.

To reiterate, motor controller 802 may operate in a driving mode or a sensing mode. In the driving mode, motor controller 802 drives motor 100 such that rotor 102 rotates around stator 104. In the sensing mode, motor controller 802 drives one leg of motor 100, sets one leg of motor 100 to ground and floats the remaining leg of motor 100 to monitor a BEMF in the floating leg. The driving mode was described previously with reference to FIG. 6, whereas the sensing mode will be described with reference to FIG. 9.

Figure 9:
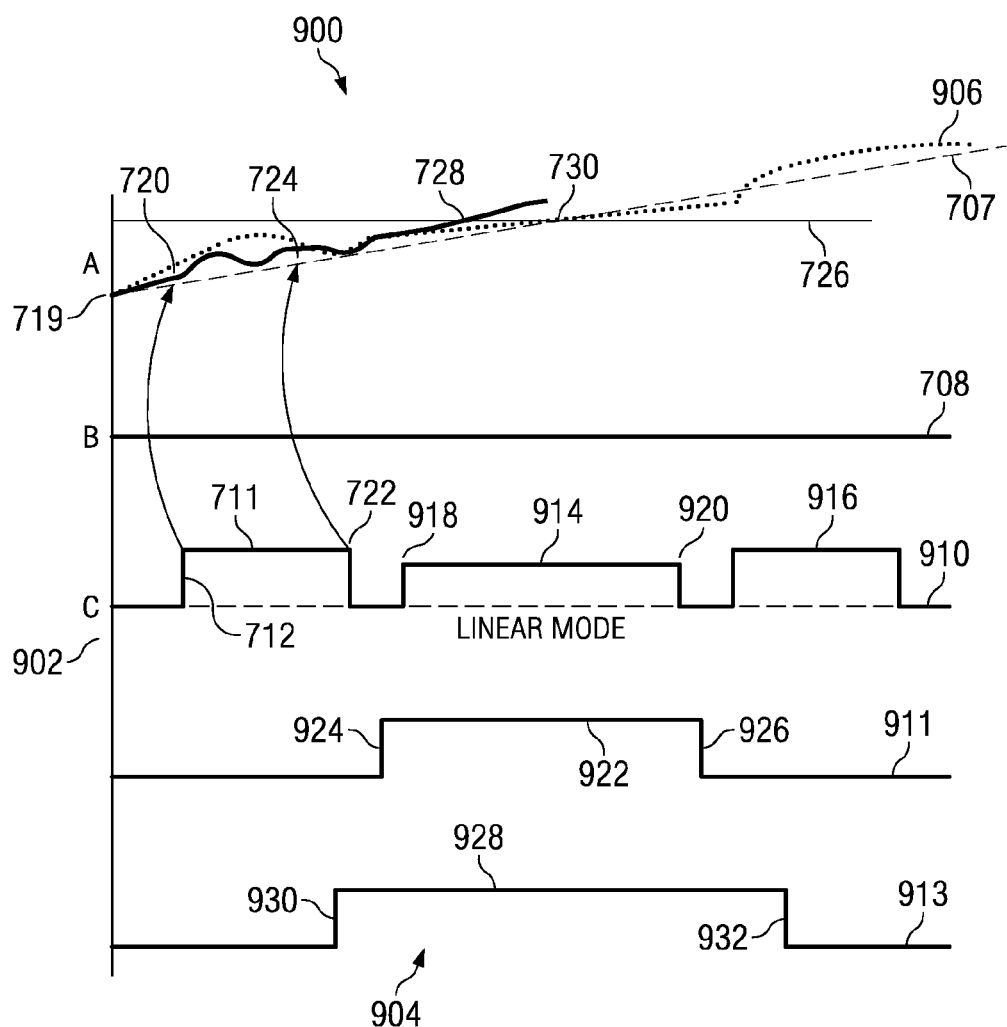
FIG. 9 is a graph of waveforms illustrating operation of the motor system described with reference to FIG. 8 when operating in sensing mode, in accordance with an aspect of the present invention.

FIG. 9 is a graph 900 of waveforms illustrating operation of motor system 800 of FIG. 8 when operating in sensing mode, in accordance with an aspect of the present invention.

Graph 900 includes a y-axis 902, in Volts, and an x-axis 904, in milliseconds. Graph 900 includes waveform 708, a waveform 906, a waveform 910, a waveform 911 and a waveform 913.

With additional reference to FIG. 8, waveform 910 represents signal line 422 as driven by driver 804 and selected by switch 406. Waveform 910 includes pulse 711 with rising edge 712 and falling edge 722, a pulse 914 with a rising edge 918 and a falling edge 920 and a pulse 916.

In conventional methods, as discussed previously, dashed line 726 is set as the average of the voltage of the driven leg (in this example second leg 114) and the leg set to ground (in this example, first leg 112). Clearly, as the driven leg is driven with a non-direct driving signal (including PWM signals), an average of the voltages of the driven leg and the leg set to ground would additionally be a non-direct driving signal. However, for purposes of discussion, dashed line 726 is shown as a constant voltage.

Waveform 911 represents signal 808 sourced by controller 802. Waveform 911 includes a pulse 922 with a rising edge 924 and a falling edge 926.

Waveform 911 could also represent signal 806 when driver 803 is selected for linear operation or represent signal 810 when driver 805 is selected for linear operation.

During the time period for pulse 922, controller 802 may select driver 804 for presentation to signal line 422 and select driver 804 for linear operation.

Waveform 913 represents signal 438 sourced by controller 408. Waveform 913 includes a pulse 928 with a rising edge 930 and a falling edge 932.

During the time period for pulse 928, first leg 112 receives ground potential, second leg 114 is sourced by driver 804 and third leg 116 is configured for a condition of floating. Furthermore, sensor 402 receives signal 436 for determining a value for BEMF associated with signal 436.

Dotted waveform 906 represents the voltage on signal line 424, i.e., the BEMF induced on third leg 116. Dotted waveform 906 increases generally linearly as denoted by linear reference line 707. Dashed line 726 is a predetermined threshold, wherein when dotted waveform 906 crosses dashed line 726, rotor 102 is in a known location relative to stator 104. In this example, dotted waveform 906 closely follows linear reference line 707, with dotted waveform 906 crossing dashed line 726 at point 730. Accordingly, at the time of point 730 the location of rotor 102 would be known relative to stator 104. With this known location, controller would be able to instruct drivers 803, 804 and 805 precisely when to reverse the polarities on the driving signals for motor 100, for example as discussed above with reference to FIGS. 2B-C.

As discussed previously with reference to FIG. 7, clotted waveform 706 did not follow linear reference line 707 as a result of errors. Dotted waveform 706 instead crossed dashed line 726 at a location denoted by point 728, before point 730. Accordingly, at the time of point 728 the location of rotor 102 would be incorrectly assessed relative to stator 104. With this incorrect location, controller 408 may incorrectly instruct drivers 411, 412 and 413 when to reverse the polarities on the driving signals for motor 100, for example as discussed above with reference to FIGS. 2E-F. However, for the present invention, waveform 906 crosses linear reference line 707 at an appropriate point as denoted by point 730. As a result waveform 906 crossing linear reference line 707 at point 730, controller 802 appropriately instructs drivers 803, 804 and 805 when to reverse the polarities on the driving signals for motor 100, for example as discussed above with reference to FIGS. 2A-D.

The errors discussed previously with respect to FIG. 7 preventing dotted waveform 706 from following linear reference line 707 as a result of acute changes in the BEMF associated with impulses in the driving signal in the driven leg have been removed for waveform 906. The very high frequency aspects of the rising and falling edges as described with reference to FIG. 7, which created drastic changes in dotted waveform 706 have been removed as a result of the driven leg being sourced by a linear signal characterized by pulse 914. Pulse 914 does not transition during the period of time surrounding point 730 thereby preventing noise from occurring when sensing BEMF as realized previously with regard to conventional methods.

For brevity of discussion, illustrations and descriptions with reference to FIG. 9 are considered for a portion of a cyclical period associated with the operation of motor system 800. For example, for a different portion of the cyclical period associated with motor system 800, waveform 906 may be configured for ground potential, waveform 708 may be configured for a pulse width modulated signal and waveform 910 may be configured for high impedance signal.

FIG. 9 presents a graph of waveforms illustrating the operation for motor system 800 of FIG. 8 when in sensing mode. Here a controller may receive an average value calculation for configuring a driver for high impedance. This will enable a determination of a value for BEMF associated with the signal being driven by the driver. Further, the controller may also configure another driver for sourcing an alternate signal in order to reduce noise associated with the signal interfering with the BEMF determination.

Figure 10:
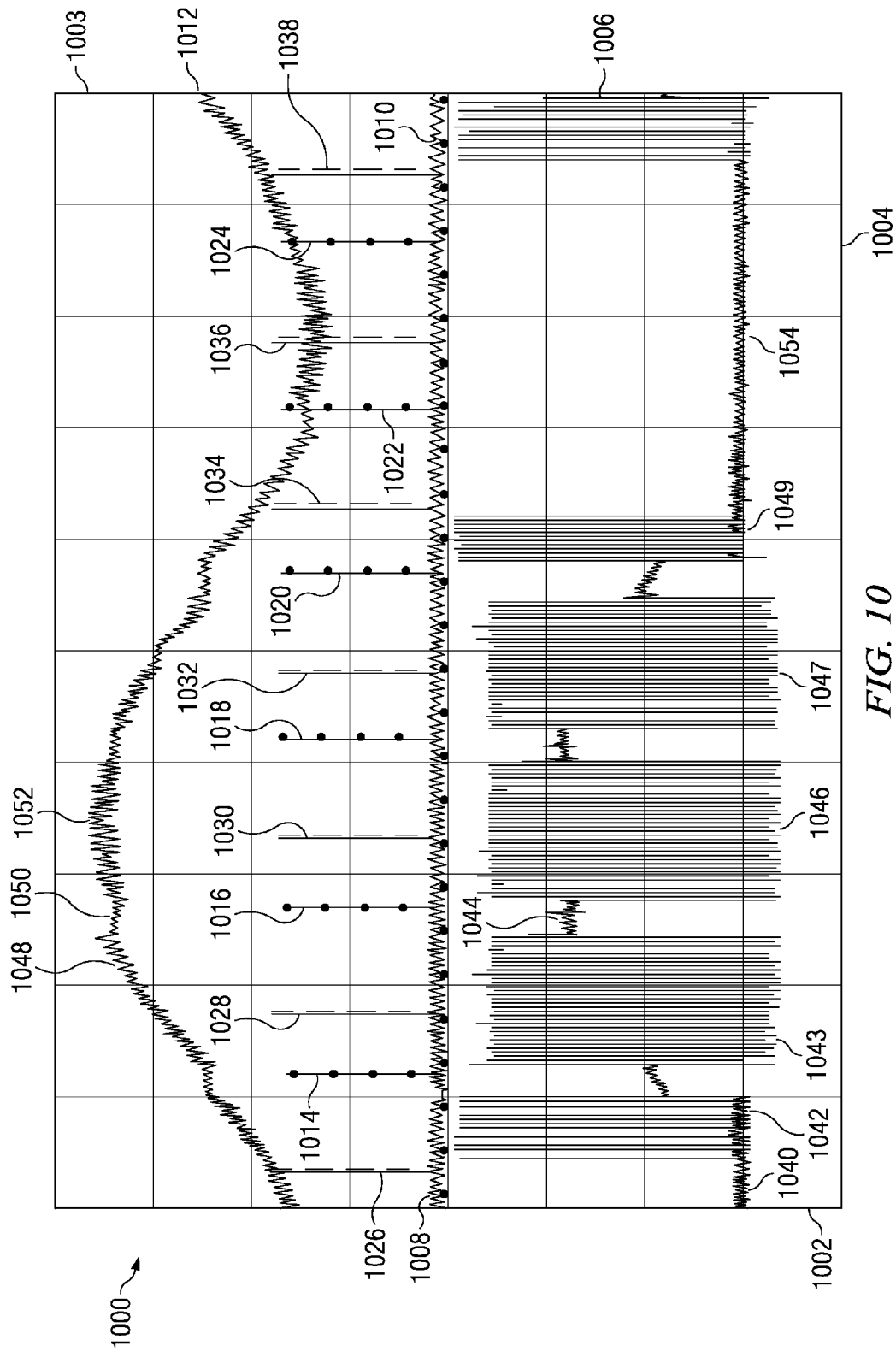
FIG. 10 is a graph of waveforms illustrating the operation of a motor system described with reference to FIG. 8 when in sensing mode and driving mode, in accordance with an aspect of the present invention.

FIG. 10 is a graph 1000 of waveforms illustrating the operation of motor system 800 of FIG. 8 when in sensing mode or driving mode, in accordance with an aspect of the present invention.

Graph 1000 includes a y-axis 1002, in Volts, a y-axis 1003, in Amps, and an x-axis 1004, in milliseconds. Graph 1000 includes a waveform 1006, a dotted waveform 1008, a dashed waveform 1010 and a waveform 1012.

Graph 1000 represents one cycle or rotation of operation for motor 100 with portions associated with driving mode and portions associated with sensing mode.

Dotted waveform 1008 represents a voltage indicating various stages of motor 100 during one cycle or rotation of operation. As an example, motor 100 may experience a multiplicity of different periods of electrical operation per one cycle of mechanical rotation. The number of different periods of electrical operation per cycle of mechanical rotation for motor 100 may vary depending upon the configuration of motor 100.

Dotted waveform 1008 includes an impulse 1014, an impulse 1016, an impulse 1018, an impulse 1020, an impulse 1022 and an impulse 1024.

Figure 5:
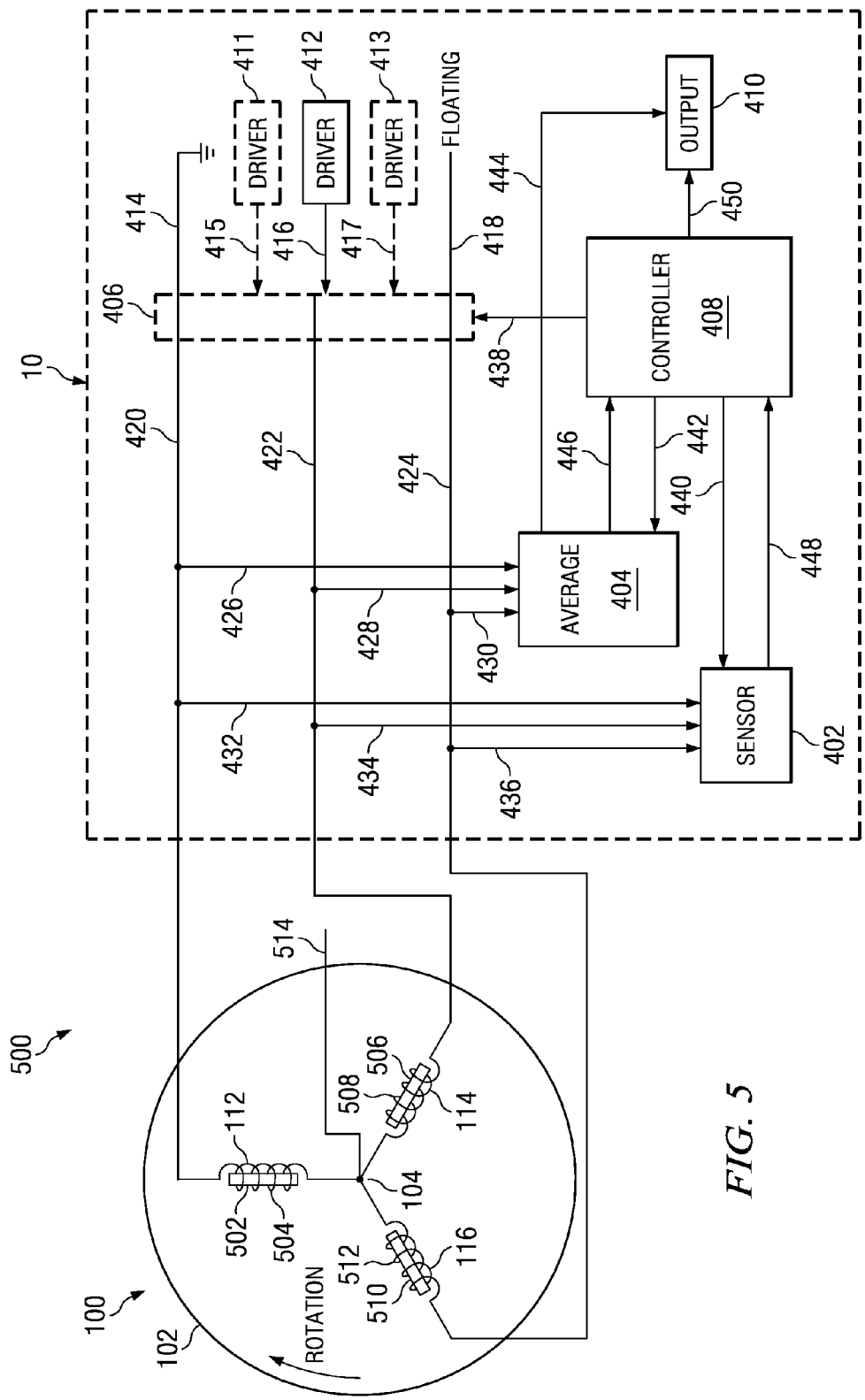
FIG. 5 presents an illustration for an example conventional motor system, when operating in a sensing mode.
Figure 7:
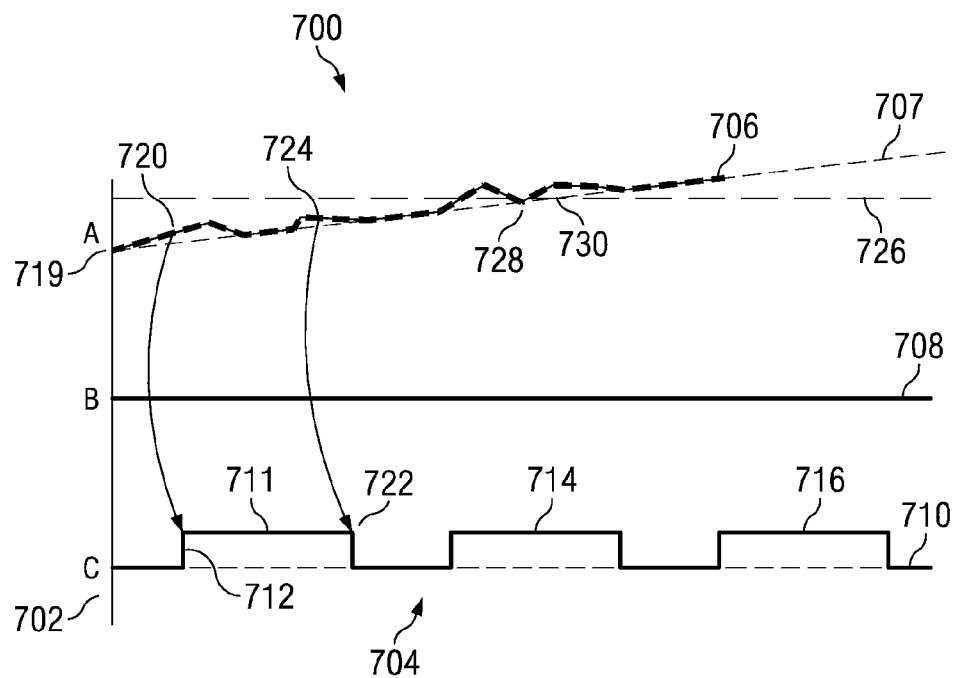
FIG. 7 presents an illustration of an example graph of waveforms for a motor system described above with reference to FIG. 5, when operating in the sensing mode.

With additional reference to FIGS. 5 and 7, impulses 1014, 1016, 1018, 1020, 1022 and 1024 represent a condition of the voltage for the high impedance leg of motor 100, third leg 116, when in sensing mode and crossing a particular threshold voltage as denoted by dashed line 726 (e.g. point 730 as illustrated in FIG. 9).

An impulse exhibited by dotted waveform 1008 represents the voltage for a leg of motor 100 crossing a threshold value and with motor 100 operating in sensing mode. At periods of time not represented by impulses for dotted waveform 1008, motor 100 operates in driving mode.

Dashed waveform 1010 represents a condition of a voltage exhibited by a leg of motor 100 operating in driving mode.

Dashed waveform 1010 includes an impulse 1026, an impulse 1028, an impulse 1030, an impulse 1032, an impulse 1034, an impulse 1036 and an impulse 1038.

An impulse exhibited by dashed waveform 1010 represents the transitioning of motor 100 from one stage or operating condition to another stage or operating condition.

Waveform 1006 represents a voltage exhibited for a leg of motor 100 (e.g. third leg 116) being driven by a ground potential, a pulse modulated signal and also a high impedance condition (e.g. signal line 424 (FIG. 8)).

Waveform 1006 includes a ground potential portion 1040, a pulse width modulated portion 1042, a pulse width modulated portion 1043, a high impedance portion 1044, a pulse width modulated portion 1046, a pulse width modulated portion 1047, a pulse width modulated portion 1049 and a low portion 1054.

The initiation of pulse width modulated portion 1042, also represented by impulse 1026, represents a transition into a first drive cycle associated with a position for motor 100. The drive cycle initiated in pulse width modulated portion 1042 remains in effect until approximately the midpoint of pulse width modulated portion 1043, also represented by impulse 1028.

At approximately the midpoint of pulse width modulated portion 1043, also represented by impulse 1028, a second drive cycle associated with a position for motor 100 is initiated. Second drive cycle remains in effect until approximately the midpoint of pulse width modulated portion 1046, also represented by impulse 1030.

At approximately the midpoint of pulse width modulated portion 1046, also represented by impulse 1030, a third drive cycle associated with a position for motor 100 is initiated. Third drive cycle remains in effect until approximately the midpoint of pulse width modulated portion 1047, also represented by impulse 1032.

At approximately the midpoint of pulse width modulated portion 1047, also represented by impulse 1032, a fourth drive cycle associated with the position for motor 100 is initiated. Fourth drive cycle remains in effect until approximately the end of pulse width modulated portion 1049, also represented by impulse 1034.

At approximately the endpoint of pulse width modulated portion 1049, also represented by impulse 1034, a fifth drive cycle associated with a position for motor 100 is initiated. Fifth drive cycle remains in effect until approximately the midpoint of low portion 1054, also represented by impulse 1036.

At approximately the midpoint of low portion 1054, also represented by impulse 1036, a sixth drive cycle associated with the position for motor 100 is initiated. Sixth drive cycle remains in effect until the initiation of pulse width modulated portion 1042, also represented by impulse 1026.

The description with reference to FIG. 8 and FIG. 9 may represent the second drive cycle as illustrated with reference to FIG. 10. Further, a pulse width modulated portion 1048 may represent discussion with reference to FIG. 6. Still further, a high impedance portion 1050 may represent discussion with reference to FIG. 9. Furthermore, impulse 1016 may be sourced by signal 448 generated by sensor 402 for delivery to controller 408.

During ground potential portion 1040, a leg of motor 100 may be driven to ground potential.

Figure 6:
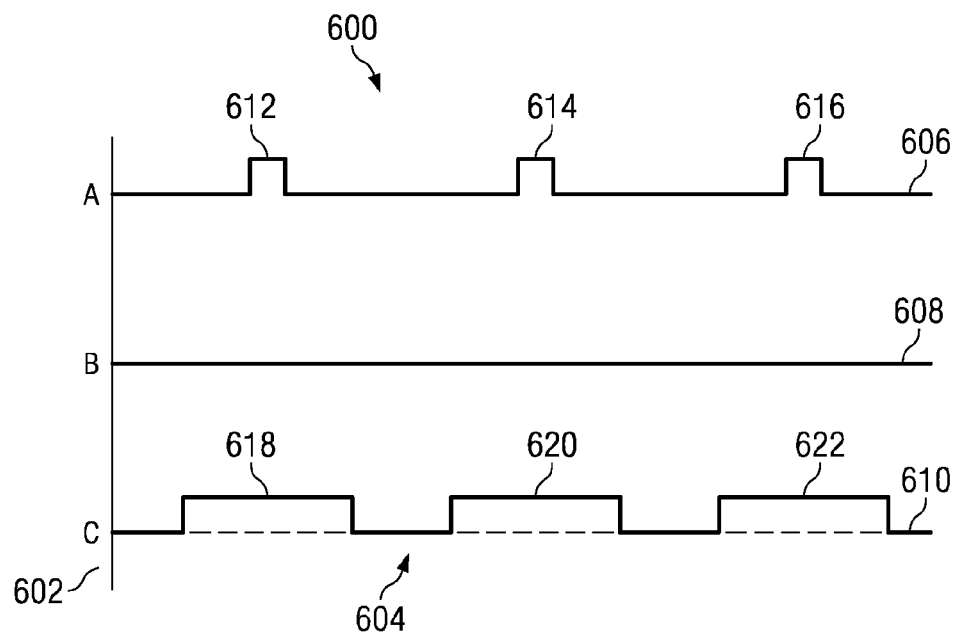
FIG. 6 presents an illustration of an example graph of waveforms for the conventional motor system described with reference to FIG. 5, when operating in the driving mode.

During pulse width modulated portion 1042, pulse width modulated portion 1043 and pulse width modulated portion 1046, a leg of motor 100 may be driven by a pulse width modulated signal, for example waveform 610 as described with reference to FIG. 6.

During high impedance portion 1044, a leg of motor 100 may be configured for linear operation, for example pulse 914 as described with reference to FIG. 9.

Impulse 1026 represents the transition from ground potential portion 1040 to pulse width modulated portion 1042.

Impulse 1028 represents the transition from pulse width modulated portion 1043 to high impedance portion 1044 for a leg of motor 100. Furthermore, impulse 1028 may represent the transition to a linear mode of operation for another leg of motor 100 as illustrated by pulse 914 described above with reference to FIG. 9.

Impulse 1030 represents the transition from high impedance portion 1044 to pulse width modulated portion 1046.

Impulse 1016 represents a condition of a voltage exhibited by a floating leg for motor 100 crossing a threshold value (e.g. point 730 of FIG. 9) and initiation for measurement of BEMF.

Figure 4:
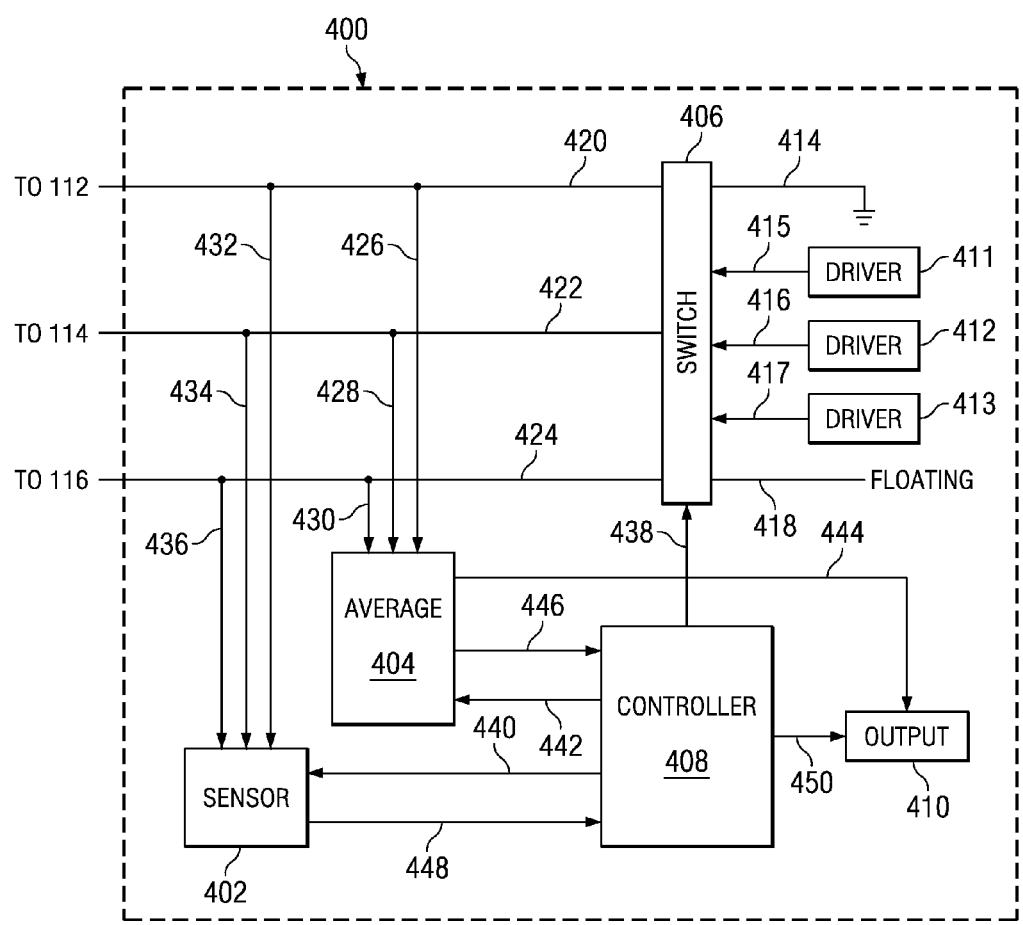
FIG. 4 illustrates an example motor controller.

Waveform 1012 represents a current exhibited for a leg of motor 100 (e.g. third leg 116 (FIG. 4)) being driven by a pulse modulated signal and also being driven to a high impedance condition (e.g. signal line 424 (FIG. 8)).

The current exhibited by waveform 1012 may be controlled via the configuration of pulses applied to the legs of motor 100. For example, the waveforms as described with reference to FIG. 6 may represent one portion of waveform 1012. Furthermore, switching the operation of waveforms of FIG. 6 (e.g. switching the operation of waveform 606 and waveform 610) may represent a different portion of waveform 1012.

Waveform 1012 includes pulse width modulated portion 1048, high impedance portion 1050 and a pulse width modulated portion 1052.

During pulse width modulated portion 1048 and pulse width modulated portion 1052, a leg of motor 100 may be driven by a pulse width modulated signal, for example waveform 610 as described with reference to FIG. 6.

During high impedance portion 1050, a leg of motor 100 may be configured for high impedance, for example waveform 906 as described with reference to FIG. 9.

Figure 11:
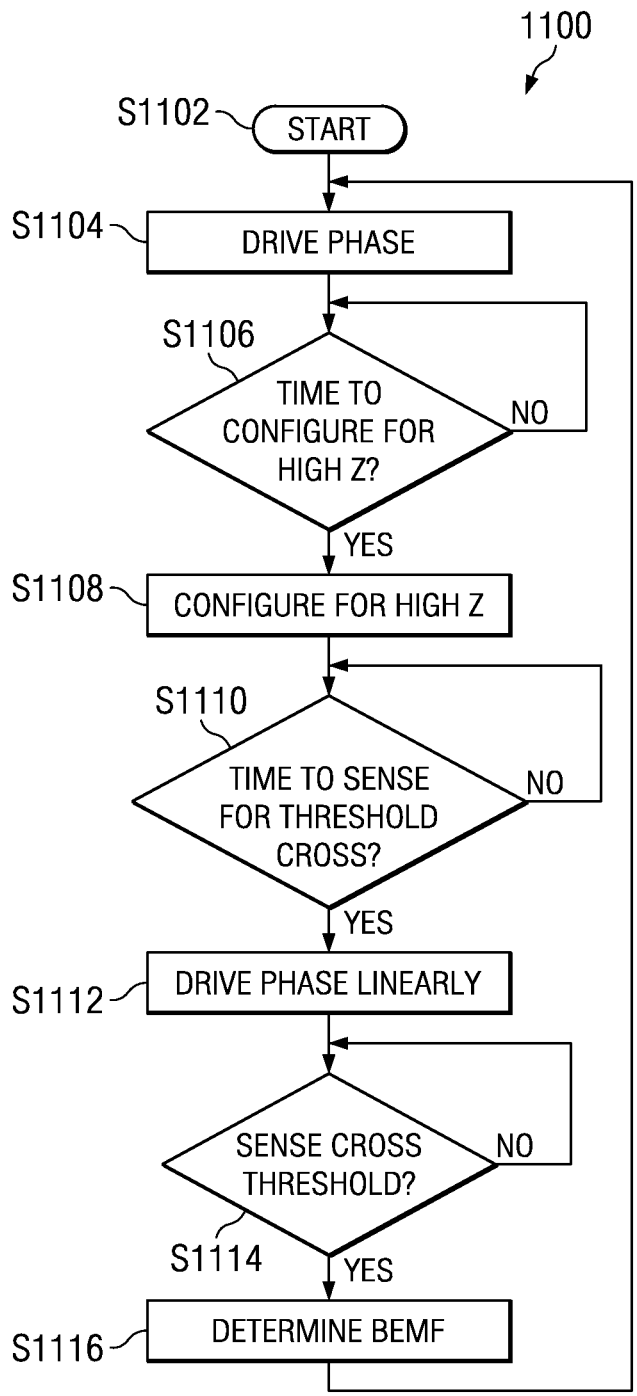
FIG. 11 illustrates an exemplary method for operation of the motor system as described with reference to FIG. 8, in accordance with an aspect of the resent invention.

FIG. 11 illustrates an example method 1100 for operating motor system 800, in accordance with an aspect of the present invention.

In the example embodiment, method 1100 starts (S1102) and motor system 800 is configured for driving mode (S1104) as described previously with respect to FIG. 6. In an example embodiment, controller 802 configures first leg 112, second leg 114 and third leg 116 as being driven by driver 803, 804 and 805, respectively. As a non-limiting example, signal for driving legs includes pulse width modulation. As a non-limiting example, a leg may be driven by a voltage potential exhibiting direct current.

Controller 802 (FIG. 8) may control configuration of legs for determining BEMF of a leg.

A determination may be performed by controller for determining an appropriate time for performance of sensing mode with a leg configured for high impedance as described with reference to FIG. 9 (S1106).

For a determination performing sensing mode and configuring a leg for high impedance (S1106), controller may configure a switch (e.g. switch 406 (FIG. 8)) sourcing a leg of motor 100 (e.g. third leg 116 (FIG. 8)) for high impedance (S1108).

Configuring a leg for high impedance may provide controller opportunity for determining BEMF for leg configured for high impedance and provide for efficient operation of a motor.

A determination may be performed by controller for determining an appropriate time of sensing for voltage of a leg configured for high impedance crossing a threshold (S1110).

Based on previous operation of motor, controller may determine a window of time for sensing a leg configured for high impedance crossing a threshold (e.g. dashed line 726). Threshold may be based upon an average of the voltages exhibited by the other two legs of the motor.

For a determination of an appropriate time for sensing threshold crossing (S1110), controller may configure motor system 800 to drive one leg of motor 100 (e.g. second leg 114 (FIG. 8)) linearly as described with reference to FIG. 9 (S1112).

Configuring one leg of motor 100 for linear operation may reduce noise and errors due to an absence of rising and falling edges (e.g. as demonstrated by pulse 914 (FIG. 9)) and provide a more accurate determination of BEMF.

A determination may be performed by controller for determining the voltage exhibited by the leg configured for high impedance crossing a threshold value (S1114).

A sensor (e.g. sensor 402 (FIG. 8)) may determine the voltage exhibited by high impedance signal (e.g. signal 436 (FIG. 8)). Furthermore, an average calculating portion (e.g. average portion 404 (FIG. 8)) may perform an average calculation of first leg and second leg. Controller may compare value provided by sensor and average calculation portion for determining a crossing event.

For a determination of a threshold crossing (S1114), a determination for BEMF may be determined (S1116).

Calculation for BEMF may be performed with less errors and noise than conventionally as a result of second leg being configured for linear operation.

Following BEMF calculation (S1116), execution of method 1100 may return to driving mode (S1104).

As illustrated, linearly driving a leg of a three-phase motor during determination of BEMF may improve performance of a motor system as a result of reducing error and noise associated with conventional system's rising and falling edges for legs driven by a pulse width modulated signal.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A method for driving a three-phase motor with a driver, the driver being operable to provide a pulse-width modulated driving signal and a linear driving signal, the three-phase motor having a first leg, a second leg and a third leg, said method comprising:
   connecting the second leg to the driver;
   floating the third leg;
   driving the second leg with the pulse-width-modulated driving signal from the driver;
   estimating a time when a voltage in the third leg will reach a predetermined threshold; and
   driving the second leg with the linear driving signal during the time.

2. The method of claim 1, further comprising:
   determining when the voltage in the third leg reaches the predetermined threshold at a first time; and
   determining when the voltage in the third leg reaches the predetermined threshold at a second time,
   wherein said estimating a time when a voltage in the third leg will reach a predetermined threshold comprises estimating when the voltage in the third leg will reach the predetermined threshold at a third time based on the first time and the second time.

3. The method of claim 2, further comprising connecting the first leg to ground.

4. The method of claim 3,
   wherein said driving the second leg with the pulse-width-modulated driving signal from the driver comprises driving the second leg with a pulse-width-modulated driving signal having a first absolute value amplitude,
   wherein said driving the second leg with the linear driving signal during the time comprises driving the second leg with a linear driving signal having a second absolute value amplitude, and
   wherein the first absolute value amplitude is greater than the second absolute value amplitude.

5. The method of claim 2, further comprising:
   connecting the second leg to the driver;
   floating the first leg;
   driving again the second leg with the pulse-width-modulated driving signal from the driver;
   estimating a second time when a voltage in the first leg will reach a predetermined threshold; and
   driving again the second leg with the linear driving signal during the second time.

6. The method of claim 5,
   wherein said driving the second leg with the pulse-width-modulated driving signal from the driver comprises driving the second leg with a pulse-width-modulated driving signal having a first absolute value amplitude,
   wherein said driving the second leg with the linear driving signal during the time comprises driving the second leg with a linear driving signal having a second absolute value amplitude, and wherein the first absolute value amplitude is greater than the second absolute value amplitude.

7. The method of claim 1, further comprising connecting the first leg to ground.

8. The method of claim 7,
wherein said driving the second leg with the pulse-width-modulated driving signal from the driver comprises driving the second leg with a pulse-width-modulated driving signal having a first absolute value amplitude,
wherein said driving the second leg with the linear driving signal during the time comprises driving the second leg with a linear driving signal having a second absolute value amplitude, and
wherein the first absolute value amplitude is greater than the second absolute value amplitude.

9. The method of claim 1, further comprising:
connecting the second leg to the driver;
floating the first leg;
driving again the second leg with the pulse-width-modulated driving signal from the driver;
estimating a second time when a voltage in the first leg will reach a predetermined threshold; and
driving again the second leg with the linear driving signal during the second time.

10. The method of claim 9,
wherein said driving the second leg with the pulse-width-modulated driving signal from the driver comprises driving the second leg with a pulse-width-modulated driving signal having a first absolute value amplitude,
wherein said driving the second leg with the linear driving signal during the time comprises driving the second leg with a linear driving signal having a second absolute value amplitude, and
wherein the first absolute value amplitude is greater than the second absolute value amplitude.

11. The method of claim 1,
wherein said driving the second leg with the pulse-width-modulated driving signal from the driver comprises driving the second leg with a pulse-width-modulated driving signal having a first absolute value amplitude,
wherein said driving the second leg with the linear driving signal during the time comprises driving the second leg with a linear driving signal having a second absolute value amplitude, and
wherein the first absolute value amplitude is greater than the second absolute value amplitude.

12. A system for driving a three-phase motor having a first leg, a second leg and a third leg, said system comprising:
a driver operable to provide a pulse-width modulated driving signal and a linear driving signal;
a switch operable to connect to connect the first leg to ground, to connect the second leg and to said driver and to float the third leg; and
a controller operable to instruct said driver to drive said second leg with the pulse-width modulated driving signal at a first time and to instruct said driver to drive said second leg with the linear driving signal at a second time,
wherein the second time corresponds to a time when a voltage in the third leg reaches a predetermined threshold.

13. The system of claim 12, further comprising:
a sensor operable to detect when a voltage on the third leg reaches the predetermined threshold at a third time, to detect when a voltage on the third leg reaches the predetermined threshold at a fourth time,
wherein said controller is further operable to estimate the second time based on the third time and the fourth time.

14. The system of claim 13,
wherein said controller is operable to instruct said driver to drive the second leg with the pulse-width-modulated driving signal having a first absolute value amplitude,
wherein said controller is operable to instruct said driver to drive the second leg with a linear driving signal having a second absolute value amplitude, and
wherein the first absolute value amplitude is greater than the second absolute value amplitude.

15. A tangible computer-readable media having computer-readable instructions stored thereon, the computer-readable instructions being capable of being read by a computer to be used for driving a three-phase motor with a driver, the driver being operable to provide a pulse-width modulated driving signal and a linear driving signal, the three-phase motor having a first leg, a second leg and a third leg, the tangible computer-readable instructions being capable of instructing the computer to perform the method comprising:
connecting the second leg to the driver;
floating the third leg;
driving the second leg with the pulse-width-modulated driving signal from the driver;
estimating a time when a voltage in the third leg will reach a predetermined threshold; and
driving the second leg with the linear driving signal during the time.

16. The tangible computer-readable media of claim 15, the computer-readable instructions being capable of instructing the computer to perform said method further comprising:
determining when the voltage in the third leg reaches the predetermined threshold at a first time; and
determining when the voltage in the third leg reaches the predetermined threshold at a second time,
wherein said estimating a time when a voltage in the third leg will reach a predetermined threshold comprises estimating when the voltage in the third leg will reach the predetermined threshold at a third time based on the first time and the second time.

17. The tangible computer-readable media of claim 16, the computer-readable instructions being capable of instructing the computer to perform said method further comprising connecting the first leg to ground.

18. The tangible computer-readable media of claim 17, the computer-readable instructions being capable of instructing the computer to perform said method
wherein said driving the second leg with the pulse-width-modulated driving signal from the driver comprises driving the second leg with a pulse-width-modulated driving signal having a first absolute value amplitude,
wherein said driving the second leg with the linear driving signal during the time comprises driving the second leg with a linear driving signal having a second absolute value amplitude, and
wherein the first absolute value amplitude is greater than the second absolute value amplitude.

19. The tangible computer-readable media of claim 16, the computer-readable instructions being capable of instructing the computer to perform said method further comprising:
connecting the second leg to the driver;
floating the first leg;
driving again the second leg with the pulse-width-modulated driving signal from the driver;
estimating a second time when a voltage in the first leg will reach a predetermined threshold; and
driving again the second leg with the linear driving signal during the second time.

20. The tangible computer-readable media of claim 19, the computer-readable instructions being capable of instructing the computer to perform said method
- wherein said driving the second leg with the pulse-width-modulated driving signal from the driver comprises driving the second leg with a pulse-width-modulated driving signal having a first absolute value amplitude,
- wherein said driving the second leg with the linear driving signal during the time comprises driving the second leg with a linear driving signal having a second absolute value amplitude, and
- wherein the first absolute value amplitude is greater than the second absolute value amplitude.

\* \* \* \* \*